United States Patent
Kuribayashi (10) Patent No.: US 7,193,760 B2
(45) Date of Patent: Mar. 20, 2007

(54) OPTICAL SCANNING DEVICE AND IMAGE FORMING APPARATUS

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/934,439

(22) Filed: Sep. 7, 2004

(65) Prior Publication Data
US 2006/0050344 A1   Mar. 9, 2006

(51) Int. Cl.
G02B 26/08   (2006.01)

(52) U.S. Cl. .................................... 359/216

(58) Field of Classification Search ............... 359/196, 359/205–206, 209–210, 213, 215, 216–218; 347/232, 244
See application file for complete search history.

(56) References Cited

U.S. PATENT DOCUMENTS

| | | | | |
|---|---|---|---|---|
| 5,183,350 | A * | 2/1993 | Kramer ......................... | 403/4 |
| 5,625,482 | A * | 4/1997 | Sugiura ....................... | 359/216 |
| 5,828,479 | A * | 10/1998 | Takano et al. .............. | 359/201 |
| 5,963,353 | A * | 10/1999 | Shibuya et al. ............. | 359/198 |
| 6,081,364 | A * | 6/2000 | Kimura ....................... | 359/204 |
| 6,310,711 | B1 * | 10/2001 | Kobayashi et al. .......... | 359/216 |
| 2003/0025973 | A1 * | 2/2003 | Yoshida ....................... | 359/204 |

FOREIGN PATENT DOCUMENTS

| | | |
|---|---|---|
| JP | 10-123448 A | 5/1998 |
| JP | 11-014931 A | 1/1999 |
| JP | 11-194285 A | 7/1999 |
| JP | 2000-347116 A | 12/2000 |

OTHER PUBLICATIONS

U.S. Appl. No. 10/820,750, filed Apr. 9, 2004, Kuribayashi.

* cited by examiner

*Primary Examiner*—Euncha P. Cherry
(74) *Attorney, Agent, or Firm*—Foley & Lardner LLP (57) ABSTRACT

An optical scanning device includes a light source, a pre-deflection optical device for applying a predetermined characteristic to a light beam irradiated from the light source, a light deflection device for deflecting the light beam having a predetermined characteristic supplied from the pre-deflection optical device in a main scanning direction by reflection, and a post-deflection optical device having an image forming lens for focusing the deflected light beam irradiated from the light deflection device on an image forming surface. Further, the optical scanning device includes a light deflection device adjusting mechanism configured to enable adjustment of an inclination quantity of the light deflection device, a pre-deflection optical device adjusting mechanism, having the light source and the pre-deflection optical device attached thereon, configured to simultaneously enable adjustment of an overall position and attitude of the light source and the pre-deflection optical device, and a post-deflection optical device adjusting mechanism configured to change a position and/or angle in a sub scanning direction of the light beam emitted from the image forming lens.

12 Claims, 7 Drawing Sheets

OPTICAL SCANNING DEVICE AND IMAGE FORMING APPARATUS

BACKGROUND OF THE INVENTION

1. Field of the Invention

The present invention relates to an optical scanning device and an image forming apparatus. For example, the invention can be applied to plural-drum type printers and copy machines and the like.

2. Description of the Related Art

In an optical scanning device applied to an image forming apparatus such as plural-drum type color copy machines and color printers, as described in Japanese Patent Laid-Open, No. 11-194285, a plurality of beams for each of color components emitted from each of light sources have their optical paths combined by a pre-deflection optical system to enter a polygon mirror. The beam deflected by the polygon mirror passes through an fθ lens which constitutes a post-deflection optical system and then is separated into the beam for each of color components to be irradiated to a drum for each of color components.

For example, it is assumed that a surface inclination is generated in a polygon mirror by a manufacturing error or an attaching error, causing optical performance degradation. Conventionally, performance degradation is improved by rotationally adjusting a cylindrical lens for each laser beam around the beam moving direction. However, this approach requires adjustment of the cylindrical lens by the number of laser beams (the number of color components) and therefore increases adjustment processes.

Although the above case is explained by taking a polygon mirror as an example, when performance degradation of other optical element components as common in a plurality of laser beams is improved, optical element components need to be adjusted by the number of laser beams (the number of color components), resulting in increased adjustment processes.

SUMMARY OF THE INVENTION

It is an object of the present invention to, provide an optical scanning device and an image forming apparatus which are capable of improving operation in fewer adjustment processes even when position, attitude, and shape errors are generated in optical element components and thereby deviate an optical path from a design value and degrade performance.

An optical scanning device of the present invention includes a light source, a pre-deflection optical device for applying a predetermined characteristic to a light beam irradiated from the light source, a light deflection device for deflecting the light beam having a predetermined characteristic supplied from the pre-deflection optical device in a main scanning direction by reflection, a post-deflection optical device having an image forming lens for focusing the deflected light beam irradiated from the light deflection device on an image forming surface, and a light deflection device adjusting mechanism configured to enable adjustment of an inclination quantity of the light deflection device.

An optical scanning device of the present invention includes a light source, a pre-deflection optical device for applying a predetermined characteristic to a light beam irradiated from the light source, a light deflection device for deflecting the light beam having a predetermined characteristic supplied from the pre-deflection optical device in a main scanning direction by reflection, a post-deflection optical device having an image forming lens for focusing the deflected light beam irradiated from the light deflection device on an image forming surface, and a pre-deflection optical device adjusting mechanism, having the light source and the pre-deflection optical device attached thereon, configured to simultaneously enable adjustment of an overall position and/or attitude of the light source and pre-deflection optical device, and adjust an incident position and/or angle in the sub scanning direction of the laser beam to the light deflection device.

An optical scanning device of the present invention includes a light source, a pre-deflection optical device for applying a predetermined characteristic to a light beam irradiated from the light source, a light deflection device for deflecting the light beam having a predetermined characteristic supplied from the pre-deflection optical device in a main scanning direction by reflection, a post-deflection optical device having an image forming lens for focusing the deflected light beam irradiated from the light deflection device on an image forming surface, and a post-deflection optical device adjusting mechanism, having at lease the image forming lens attached thereon, configured to enable adjustment of a position and/or attitude of the image forming lens and change a position and/or angle in a sub scanning direction of the light beam emitted from the image forming lens.

The image forming apparatus of the present invention includes an optical scanning device of the present invention.

DESCRIPTION OF THE PREFERRED EMBODIMENTS (A) Preferred Embodiment

A preferred embodiment of an optical scanning device and an image forming apparatus of the present invention will be described below with reference to drawings.

Figure 1:
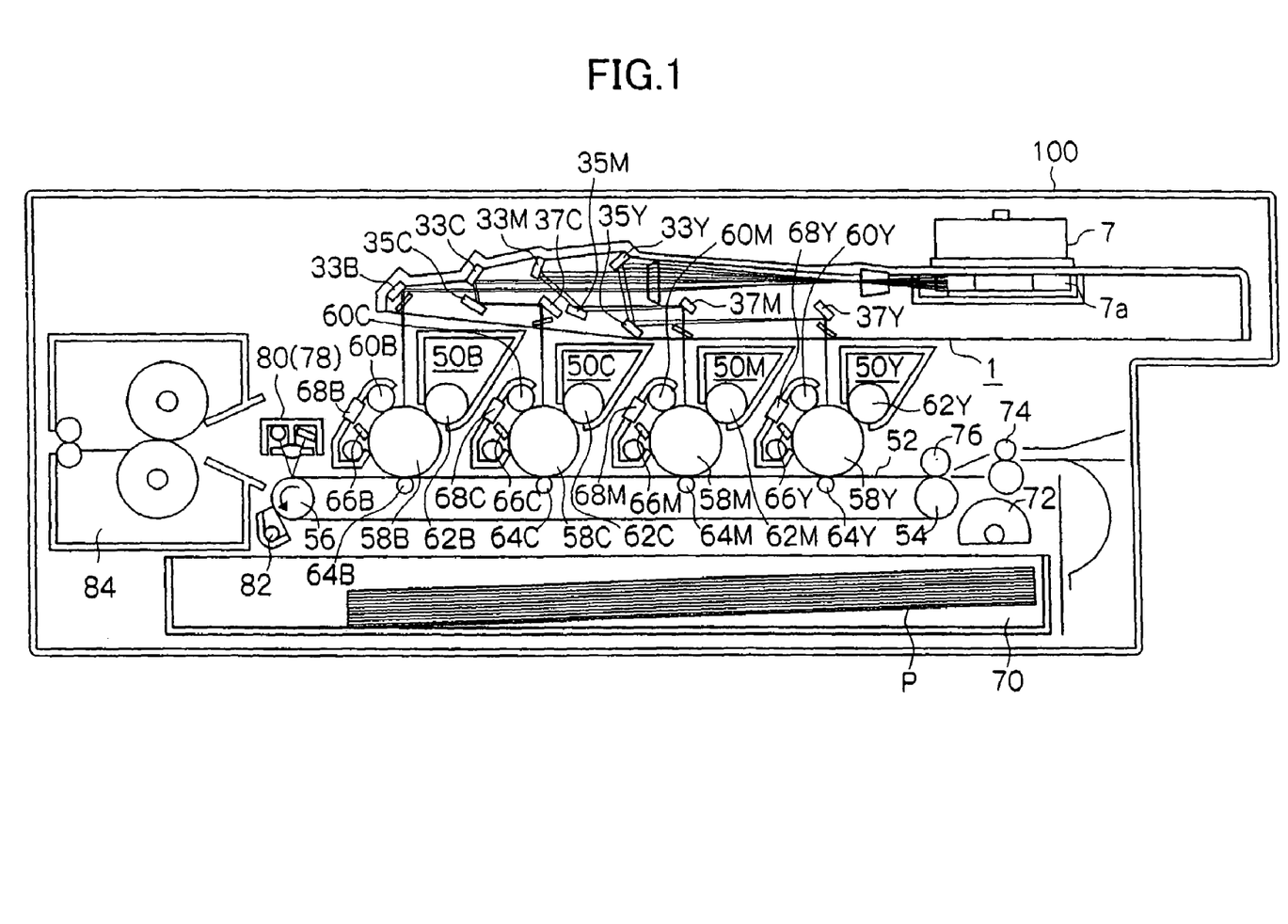
FIG. 1 is a schematic cross sectional view illustrating a color image forming apparatus according to an embodiment of the present invention.

FIG. 1 illustrates a color image forming apparatus incorporating the optical scanning device according to the preferred embodiment of the present invention. In this kind of color image forming apparatus, since there is generally employed four kinds of image data separated into each of colors including yellow (Y), magenta (M), cyan (C) and black (B) and four sets of various apparatuses for forming the image at each of the color components corresponding to each of Y, M, C and B, structure is made such as to identify the image data at each of the color components and the corresponding mechanism by adding Y, M, C and B to each of reference numerals.

As shown in FIG. 1, an image forming apparatus 100 includes first to fourth image forming units 50Y, 50M, 50C, and 50B for forming the image at each of the separated color components.

The respective image forming units 50 (Y, M, C, and B) are arranged in the order of 50Y, 50M, 50C and 50B below an optical scanning device 1 corresponding to each position at which laser beams L (Y, M, C, and B) are emitted for optical-scanning image information of each of the color components by a first folding mirror 33B and third folding mirrors 37Y, 37M, and 37C of a multi-beam optical scanning device 1 as described in detail with reference to FIGS. 2 and 3.

A transfer belt 52 for transferring transfer material on which an image formed through the respective image forming units 50 (Y, M, C, and B) are transferred is placed below the respective image forming units 50 (Y, M, C, and B).

The transfer belt 52 is passed over a belt drive roller 56 and a tension roller 54 rotated by a motor (not shown) in the direction of the arrow and is rotated at a predetermined speed in a direction of rotation of the belt drive roller 56.

The respective image forming units 50 (Y, M, C, and B), cylindrically formed so as to be rotatable in the direction of the arrow, have photosensitive drums 58Y, 58M, 58C, and 58B on which an electrostatic latent image is formed correspond to an image exposed by the optical scanning device 1.

In the space surrounding each of the photosensitive drums 58 (Y, M, C, and B), along the rotational direction of respective photosensitive drums 58 (Y, M, C, and B), there are arranged changing devices 60 (Y, M, C, and B), developing devices 62 (Y, M, C, and B), transfer devices 64 (Y, M, C, and B), cleaners 66 (Y, M, C, and B), and discharging devices 68 (Y, M, C, and B). The changing devices 60 supply a predetermined potential on the surface of the respective photosensitive drums 58 (Y, M, C, and B). The developing devices 62 perform development by supplying toner having a color corresponding to an electrostatic latent image formed on the surface of the respective photosensitive drums 58 (Y, M, C, and B). The transfer devices 64, provided at a position opposed to the respective photosensitive drums 58 (Y, M, C, and B) from the back of the transfer belt 52 with the transfer belt 52 interposed between the respective photosensitive drums 58 (Y, M, C, and B), transfer toner image of the respective photosensitive drums 58 (Y, M, C, and B) to a recording medium transferred by the transfer belt 52, that is, a paper sheet P. The cleaner 66 removes residual toner remaining on the respective photosensitive drums 58 (Y, M, C, and B) when the respective transfer devices 64 (Y, M, C, and B) transfer toner image onto the sheet P. The discharging devices 68 discharge residual potential remaining on the respective photosensitive drums 58 (Y, M, C, and B) after transfer of toner image by the respective transfer devices 64 (Y, M, C, and B).

Below the transfer belt 52, there is disposed a sheet cassette 70 for receiving the sheet P on which the image formed by the respective image forming units 50 (Y, M, C, and B) is transferred.

A generally semilunar shaped conveying roller 72 for taking out the sheet P received in the sheet cassette 70 one by one from the top is disposed at one end of the sheet cassette 70 and on the side close to the tension roller 54.

A registration roller 74 for aligning one end of a paper sheet P taken from the cassette 70 with one end of a toner image formed to the photosensitive drum 58B of the image forming unit 50B (black) is deposed between the conveying roller 72 and the tension roller 54.

An adsorption roller 76 for providing a predetermined electrostatic adsorption force to a paper sheet P transferred at a predetermined timing by the registration roller 74 is arranged to a position close to the tension roller 54 between the registration roller 74 and the first image forming unit 50Y and a position opposed to the circumference of the transfer belt 52 corresponding to the position at which the tension roller 54 substantially comes in contact with the transfer belt 52.

At one end of the transfer belt 52 and close to the belt drive roller 56, and on the circumference of the transfer belt 52 substantially coming into contact with the belt drive roller 56, there are arranged registration sensors 78 and 80 for detecting the position of an image formed on the transfer belt 52 or transferred on the sheet P in the axial direction of the belt drive roller 56 at regular intervals. (FIG. 1 is a front cross-sectional view of the color image forming apparatus so that the registration sensors 78 located in front of a sheet surface are not shown in FIG. 1.)

A transfer cleaner 82 for removing toner or the sheet P residues deposited on the transfer belt 52 is disposed at a position on the circumference of the transfer belt 52 coming into contact with the belt drive roller 56 and at a position not coming in contact with the sheet P transferred by the transfer belt 52.

A fixing device 84 for fixing toner image transferred on the sheet P on the sheet P is disposed in the direction that the sheet P transferred through the transfer belt 52 is separated away from the belt drive roller 56 and further transferred.

Figure 2:
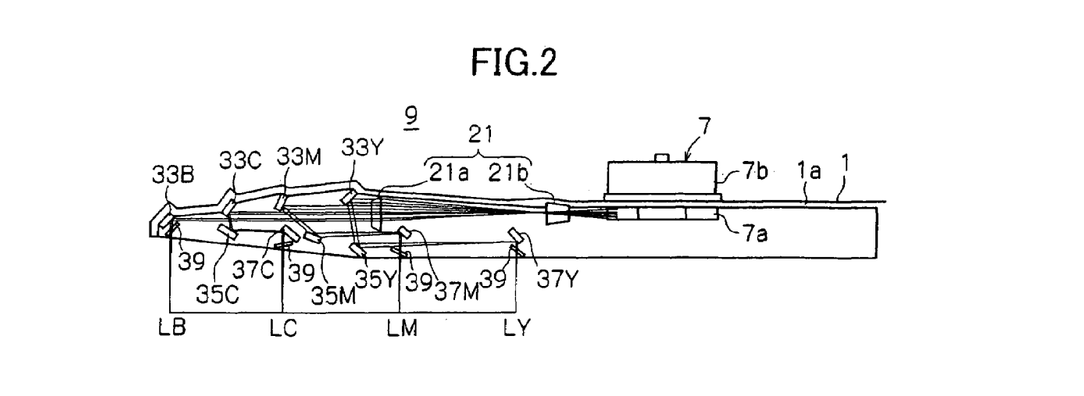
FIG. 2 is a schematic cross sectional view illustrating an element of a post-deflection optical system of an optical scanning device according to the embodiment.
Figure 3:
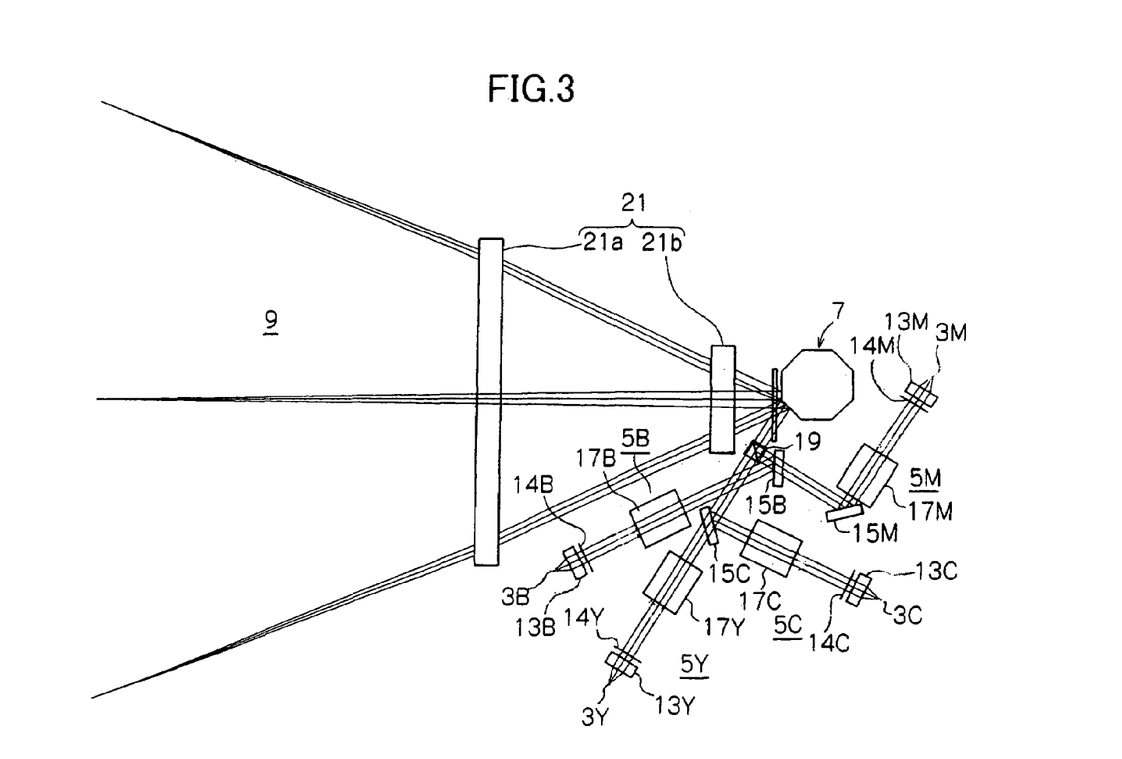
FIG. 3 is a schematic plan view illustrating an element of the optical scanning device according to the embodiment.

FIGS. 2 and 3 illustrate the multi-beam optical scanning device 1 incorporated in the image forming apparatus shown in FIG. 1.

The multi-beam optical scanning device 1 has light sources 3Y, 3M, 3C, and 3B for emitting a light beam toward the first to fourth of the respective image forming units 50Y, 50M, 50C and 50B shown in FIG. 1 and only one light deflection device 7 as deflecting means for deflecting (scanning) a light beam (laser beam) emitted by the respective light sources 3 (Y, M, C, and B) at a predetermined linear speed toward an image surface disposed in a predetermined position, that is, a circumference surface of the photosensitive drums 58Y, 58M, 58C, and 58B of the first to fourth of the respective image forming units 50Y, 50M, 50C and 50B shown in FIG. 1. Pre-deflection optical systems 5 (Y, M, C, and B) are disposed between the light deflection device 7 and the respective light sources 3 (Y, M, C, and B) and a post-deflection optical system 9 is disposed between the light deflection device 7 and the image surface.

In this case, the direction where the respective laser beams are deflected (scanned) by the light deflection device 7 is referred to as a main scanning direction. The direction perpendicular to the main scanning direction and the direction perpendicular to each axis line as the reference of a deflection movement provided to the laser beam by the light deflection device so that the laser beam scanned (deflected) by the light deflection device is in the main scanning direction, are referred to as a sub scanning direction.

Figure 4:
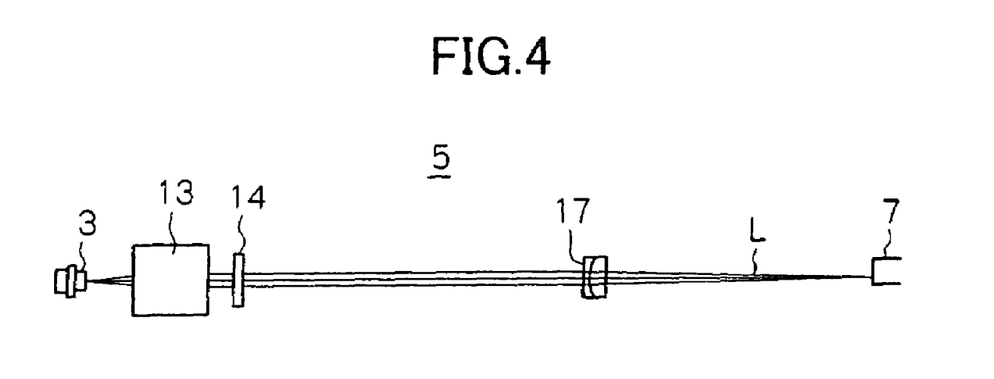
FIG. 4 is a schematic cross sectional view illustrating an element position of a pre-deflection optical system of the optical scanning device according to the embodiment by regarding an optical path as a linear optical path.

As shown in FIGS. 3 and 4 (FIG. 4 represents a laser beam L as an example), the pre-deflection optical systems 5 include the respective light sources 3 (Y, M, C, and B) for each of color components constituted by a semiconductor laser element, finite focus lenses 13 (Y, M, C, and B) for providing a predetermined convergence to a laser beam emitted from the respective light sources 3 (Y, M, C, and B), stops 14 (Y, M, C, and B) for providing a cross-sectional shape to the laser beam L passed through the finite focus lenses 13 (Y, M, C, and B), and cylinder lenses 17 (Y, M, C, and B) for further providing a predetermined convergence to the laser beam passed through the stops 14 (Y, M, C, and B) in the sub scanning direction. The pre-deflection optical systems 5 adjust the cross-sectional shape of the laser beam emitted from the respective light sources 3 (Y, M, C, and B) into a predetermined shape and guide the beam to a reflection surface of the light deflection device 7.

The cyan laser beam LC emitted from the cylinder lens 17C has its optical path folded by a folding mirror 15C and then passes through an optical parts 19 for synthesizing an optical path to be guided to the reflection surface of the light deflection device 7. The black laser beam LB emitted from the cylinder lens 17B has its optical path folded by a folding mirror 15B and then is reflected by the optical parts 19 for synthesizing an optical path to be guided to the reflection surface of the light deflection device 7. After the yellow laser beam LY emitted from the cylinder lens 17Y passes through above the folding mirror 15C, the yellow laser beam LY transmits through the optical parts 19 for synthesizing an optical path and is guided to the reflection surface of the light deflection device 7. The magenta laser beam LM emitted from the cylinder lens 17M has its optical path folded by a folding mirror 15M and passes through above the folding mirror 15B. Thereafter, the magenta laser beam LM is reflected by the optical parts 19 for synthesizing an optical path and is guided to the reflection surface of the light deflection device 7. In this example, the folding mirrors 15M, 15B, and 15C, and the optical parts 19 for synthesizing an optical path are not shown in FIG. 4.

The post-deflection optical system 9 includes an image forming lens (fθ lens) group 21 for focusing a laser beam deflected by a polygon mirror 7a on the respective photosensitive drums 58 (Y, M, C, and B) and first folding mirrors 33 (Y, M, C, and B), second folding mirrors 35 (Y, M, C, and B), and third folding mirrors 37 (Y, M, C, and B) for separating a synthetic laser beam passed through the image forming lens group 21 into a laser beam of each of color components and guiding on the corresponding photosensitive drums 58 (Y, M, C, and B). In the first embodiment, the image forming lens (fθ lens) group 21 has two lenses 21a and 21b.

The above-mentioned FIGS. 1 to 4 are drawings used for explaining a positional relationship of each component. The first embodiment has the feature in attachment of a predetermined component so that an attitude and the like are adjustable. All the relations of the features are not accurately shown in the above-mentioned FIGS. 1 to 4. A method of attachment of a predetermined component (optical element components) feature will be described in reference with FIGS. 5 to 9.

Figure 5:
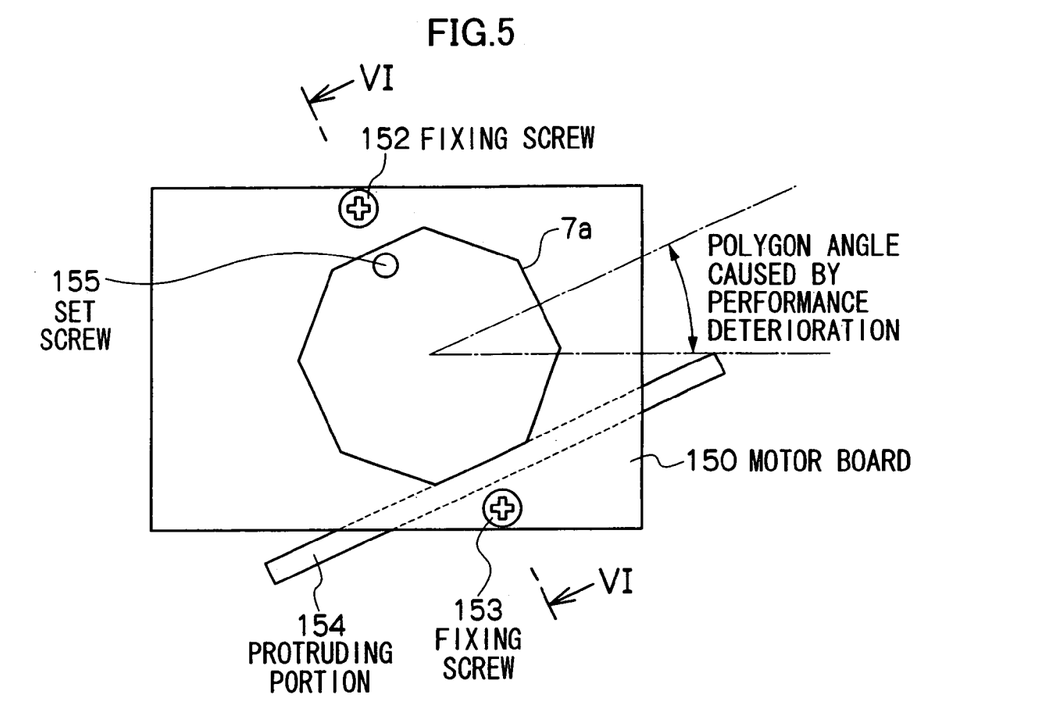
FIG. 5 is a plan view for explaining a method for attachment of a light deflection device to the optical scanning device according to the embodiment.
Figure 6:
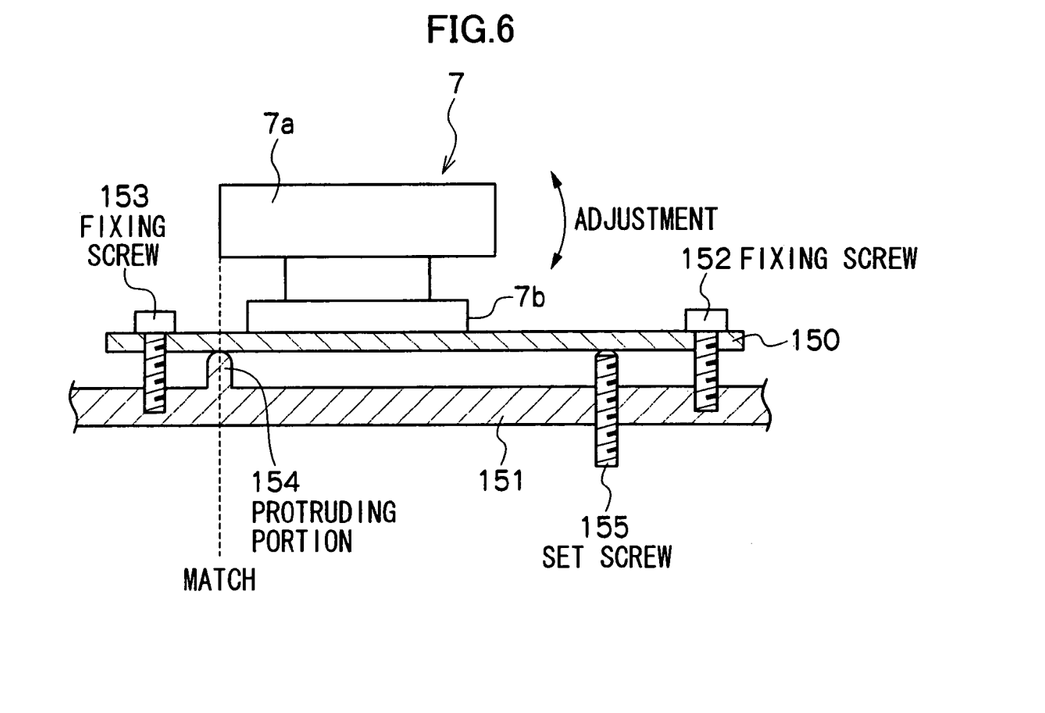
FIG. 6 is a cross section taken on line VI—VI of FIG. 5.

The light deflection device 7, made up of the polygon mirrors 7a and a polygon motor 7b, is attached as shown in FIGS. 5 and 6. In this case, FIG. 5 is a plan view. (In the case of FIGS. 1 and 2, they are considered to be a bottom view.) FIG. 6 is a cross section taken on line VI—VI of FIG. 5.

The light deflection device 7 is fixed by fixing the polygon motor 7b to a flat plate-shaped motor board 150. The motor board 150 is fixed to a fixed member 151 such a housing by a plurality of fixing screws 152 and 153 (2 screws are shown in the figures). A predetermined amount of clearance is formed between the motor board 150 and the fixed member 151 by a linear protruding portion 154 provided to top surface of the fixed member 151 and a set screw 155 threadedly engaged with a female screw provided to the fixed member 151. As shown in FIG. 5, a straight line connecting the fixing screws 152 and 153 is perpendicular to the direction where the protruding portion 154 is extended as viewed from a projection plane. The set screw 155 is positioned on this straight line. The direction of the protruding portion 154 is set to be parallel when the polygon mirror 7a is at a predetermined angle. The predetermined angle is the angle at which optical performance deterioration is largest in an image surface.

At this point, the fixing screws 152 and 153 are loosed to move the set screw 155 back and forth so that the motor board 150 is rotated around the protruding portion 154 as a fulcrum. Thereafter, the fixing screws 152 and 153 are tightened to adjust the reflection surface inclination of the polygon mirror 7a. After the adjustment, as shown in FIG. 6, the reflection surface of the polygon mirror 7a and the protruding portion 154 are positioned on the straight line at a predetermined angle.

Figure 7:
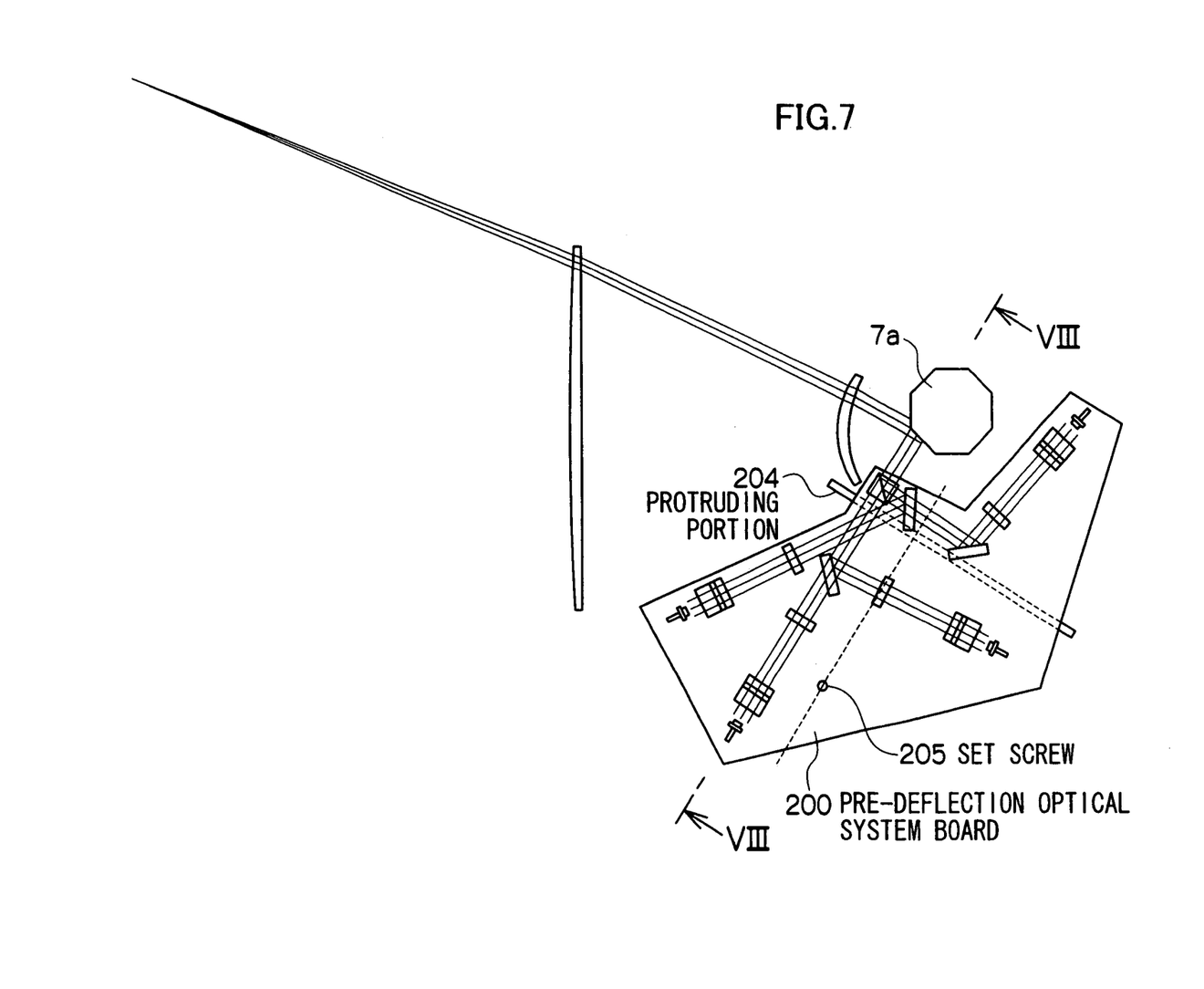
FIG. 7 is a plan view for explaining a method for attachment of the pre-deflection optical system to the optical scanning device according to the embodiment.
Figure 8:
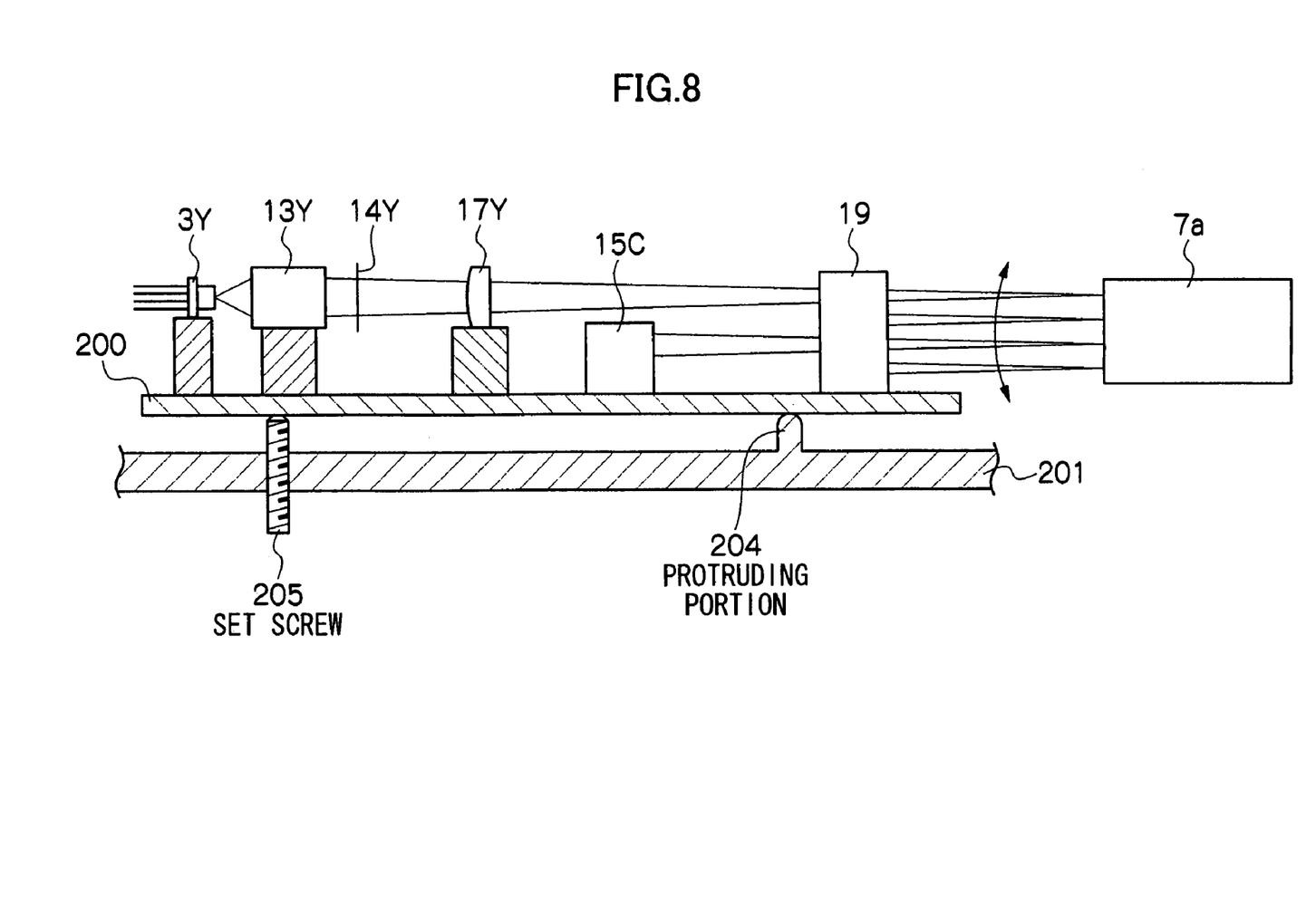
FIG. 8 is a cross section taken on line VIII—VIII of FIG. 7.

The pre-deflection optical system for each of color components is disposed as shown in FIGS. 7 and 8. FIG. 7 is a plain view. FIG. 8 is a cross section taken on line VIII—VIII of FIG. 7. Regarding the top portion of the pre-deflection optical system board mentioned blow, only components on the illustrated arrow line will be explained here. Other components are omitted.

The light sources 3 (Y, M, C, and B), the finite focus lenses 13 (Y, M, C, and B), the stops 14 (Y, M, C, and B), the cylinder lenses 17 (Y, M, C, and B), the folding mirrors 15 (Y, M, C, and B), and the optical parts 19 for synthesizing a optical path are fixed on the same flat plate-shaped pre-deflection optical system board 200. The pre-deflection optical system board 200 is fixed to a fixed member 201 such as a housing by a plurality of (for example, 2 screws) fixing screws (not shown). A predetermined amount of clearance is formed between the pre-deflection optical system board 200 and the fixed member 201 by a linear protruding portion 204 provided on top surface of fixed member 201 and a set screw 205 threadedly engaged with a female screw provided to the fixed member 201. As viewed from a projection plane, the straight line of the protruding portion 204 is perpendicular to the direction where an optical path of all laser beams from the respective light sources 3 (Y, M, C, and B) is combined toward the polygon mirror 7a. The set screw 205 is sufficiently spaced in the direction perpendicular to the protruding portion 204.

At this point, all fixing screws (not shown) are loosed to move the set screw 205 back and forth so that pre-deflection optical system board 200 is rotated around the protruding portion 204 as a fulcrum. Thereafter, all the fixing screws are tightened to adjust an incident position and angle in the sub scanning direction of a laser beam to the reflection surface of the polygon mirror 7a.

Figure 9:
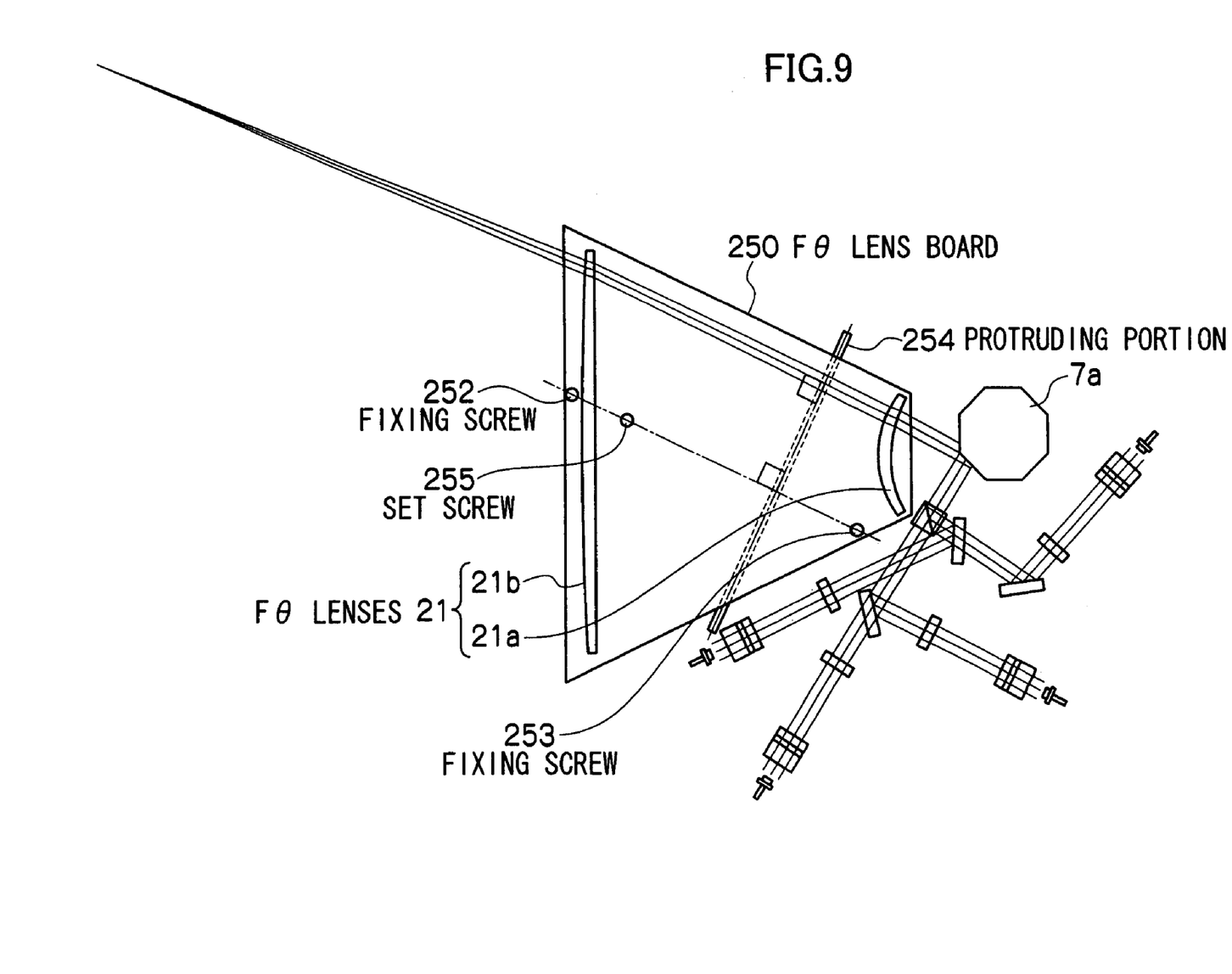
FIG. 9 is a plan view for explaining a method for attachment of an image forming lens (fθ lens) to the optical scanning device according to the embodiment.

Two fθ lenses 21a and 21b which are the main components of the post-deflection optical system 9 are fixed as shown in the plain view of FIG. 9. Although a cross section is omitted, components below the fθ lens board mentioned below are disposed the same as FIG. 4.

The two fθ lenses 21a and 21b are fixed to the same flat plate-shaped fθ lens board 250. The fθ lens board 250 is fixed to a fixed member (not shown) such as a housing with a plurality of fixing screws 252 and 253 (2 screws are shown in the figure). A predetermined amount of clearance is formed between the fθ lens board 250 and the fixed member by a linear protruding portion 254 provided to top surface of the fixed member and a set screw 255 threadedly engaged with a female screw provided to the fixed member. As shown in FIG. 9, a straight line connecting the fixing screws 252 and 253 is perpendicular to the direction where the protruding portion 254 is extended as viewed from a projection plane. The set screw 255 is positioned on this straight line. As shown in the plain view of FIG. 9, the protruding portion 254 is set so as to be perpendicular to an optical axis in which a light beam focused to a performance deterioration point passes through an fθ lens group.

At this point, the fixing screws 252 and 253 are loosed to move the set screw 255 back and forth so that the fθ lens board 250 is rotated around the protruding portion 254 as a fulcrum. Thereafter, the fixing screws 252 and 253 are tightened to adjust a synthetic laser beam from the polygon mirror 7a in a moving direction of the sub scanning direction.

Next, an adjustment method for setting the absolute value of an inclination quantity of the reflection surface of the polygon mirror 7a at zero will be explained.

(1) As a first step, the motor board 150 fixing the light deflection device 7 (polygon motor 7b) is placed on the fixed member 151. In this case, the pre-deflection optical system board 200 is not placed on the fixed member 201. In addition, the fθ lens board 250 is not placed on the fixed member. (The whole post-deflection optical system may not be placed.) (2) Next, the polygon mirror 7a is adjusted so as to set a surface inclination quantity at zero at a scanning angle. (The fixed member (housing) 151 is the reference.) (3) The pre-deflection optical system board 200 mounting the pre-deflection optical systems 5 (Y, M, C, and B) is fixed to the fixed member 201. The whole post-deflection optical system 9 is placed on the fixed member 201 including the placement of the fθ lens board 250 to the fixing member. (4) Before a laser beam from the pre-deflection optical systems (Y, M, C, and B) mounted on the pre-deflection optical system board 200 reaches the polygon mirror 7a, the pre-deflection optical system board 200 is adjusted so as to make the beam passing position close to a designed value at a predetermined point. This means that the position and attitude of the pre-deflection optical systems 5 (Y, M, C, and B) are adjusted. After adjustment of the pre-deflection optical system board 200, a discrete element of the respective pre-deflection optical systems 5 (Y, M, C, and B) may be adjusted so as to make the beam passing position close to a designed value at a predetermined point. (5) After the laser beam deflected by the polygon mirror 7a at a scanning direction passes through the two fθ lenses 21a and 21b fixed to the fθ lens board 250, the fθ lens board 250 is adjusted so as to make the beam passing position close to a designed value at a predetermined point. This means that the position and attitude of the post-deflection optical system, especially the fθ lenses 21a and 21b, are adjusted.

According to the first embodiment, the following effects can be produced.

Performance deterioration based on the reflection surface inclination of the polygon mirror 7a is prevented by adjusting the reflection surface itself. Comparing with the conventional method of adjusting the respective cylinder lenses 17 (Y, M, C, and B), only one part of polygon mirror adjustment facilitate the adjustment work.

In this case, the position and attitude of the respective pre-deflection optical systems 5 (Y, M, C, and B) are adjusted together. Further, the position and attitude of the fθ lenses 21a and 21b are also adjusted together. Therefore, the performance can be further improved.

(B) Another Example of an Adjustment Method

The adjustment method for the adjustment constitution of the above-mentioned embodiment is not limited to the above-mentioned example. The adjustment method shown as (B-1) to (B-7) mentioned below can also be applied.

(B-1) This adjustment method also sets the absolute value of an inclination quantity of the reflection surface of the polygon mirror 7a at zero in a similar manner to the adjustment method described in the above-mentioned embodiment.

In the adjustment method, the process (4), that is, the pre-deflection optical system board 200 is adjusted so as to make the beam passing position close to a designed value at a predetermined point before a laser beam from the pre-deflection optical systems (Y, M, C, and B) mounted on the pre-deflection optical system board 200 reaches the polygon mirror 7a, is omitted from the adjustment method explained in the above-mentioned embodiment. In the case where this adjustment method is fixedly applied, adjustment constitution to the pre-deflection optical system such as the pre-deflection optical system board 200 can be omitted.

(B-2) This adjustment method also sets the absolute value of an inclination quantity of the reflection surface of the polygon mirror 7a at zero in a similar manner to the adjustment method described in the above-mentioned embodiment.

In this adjustment method, the process (5), that is, the fθ lens board 250 is adjusted so as to make the beam passing position close to a designed value at a predetermined point after the laser beam deflected by the polygon mirror 7a at a scanning direction passes through the two fθ lenses 21a and 21b fixed to the fθ lens board 250, is omitted from the adjustment method explained in the above-mentioned embodiment. In the case where this adjustment method is fixedly applied, adjustment constitution to the fθ lens 21a and 21b such as the fθ lens board 250 can be omitted.

(B-3) This adjustment method sets a relative error of an inclination quantity of the reflection surface of the polygon mirror 7a at zero. In this case, the zero relative error means that an inclination quantity is appropriate judging from the relative relation of the pre-deflection optical system, the light deflection device, and the post-deflection optical system without regard to an angle seen from a reference surface such as the housing.

(1) The motor board 150 fixing the light deflection device 7 (polygon motor 7b), the pre-deflection optical system board 200 mounting the pre-deflection optical systems 5 (Y, M, C, and B), and the fθ lens board 250 mounting the fθ lenses 21a and 21b are placed. (2) Before a laser beam from the pre-deflection optical systems (Y, M, C, and B) mounted on the pre-deflection optical system board 200 reaches the polygon mirror 7a, the pre-deflection optical system board 200 is adjusted so as to make the beam passing position close to a designed value at a predetermined point. This means that the position and attitude of the pre-deflection optical systems 5 (Y, M, C, and B) are adjusted. After adjustment of the pre-deflection optical system board 200, a discrete element of the respective pre-deflection optical systems 5 (Y, M, C, and B) may be adjusted so as to make the beam passing position close to a designed value at a predetermined point. (3) After a laser beam from the pre-deflection optical systems 5 (Y, M, C, and B) group is reflected toward a scanning direction by the polygon mirror 7a, a reflection surface angle (inclination quantity) of the polygon mirror is adjusted so as to make the beam passing position close to a designed value. In this case, the measurement position is the position before the laser beam reaches the nearer fθ lens 21a. (4) After the laser beam deflected by the polygon mirror 7a at a scanning direction passes through the two fθ lenses 21a and 21b fixed to the fθ lens board 250, the fθ lens board 250 is adjusted so as to make the beam passing position close to a designed value at a predetermined point. This means that the position and attitude of the post-deflection optical system, especially the fθ lenses 21a and 21b are adjusted.

(B-4) This adjustment method also sets a relative error of an inclination quantity of the reflection surface of the polygon mirror 7a at zero. In this adjustment method, the motor board 150 is not adjusted. In the case where this adjustment method is fixedly employed in a machine, adjustment constitution of an inclination quantity of the reflection surface of the polygon mirror 7a such as the motor board 150 can be omitted.

(1) The motor board 150 fixing the light deflection device 7 (polygon motor 7b), the pre-deflection optical system board 200 mounting the pre-deflection optical systems 5 (Y, M, C, and B), and the fθ lens board 250 mounting the fθ lenses 21a and 21b are placed. (2) After a laser beam from the pre-deflection optical systems 5 (Y, M, C, and B) group is reflected toward a scanning direction by the polygon mirror 7a, the pre-deflection optical systems (Y, M, C, and B) mounted on the pre-deflection optical system board 200 are adjusted so as to make the beam passing position close to a designed value. In this case, the measurement position is the position before the laser beam reaches the nearer fθ lens 21a. After adjustment of the pre-deflection optical system board 200, a discrete element of the respective pre-deflection optical systems 5 (Y, M, C, and B) may be adjusted so as to make the beam passing position close to a designed value at a predetermined point. (3) After the laser beam deflected by the polygon mirror 7a at a scanning direction passes through the two fθ lenses 21a and 21b fixed to the fθ lens board 250, the fθ lens board 250 is adjusted so as to make the beam passing position close to a designed value at a predetermined point.

(B-5) This adjustment method also sets a relative error of an inclination quantity of the reflection surface of the polygon mirror 7a at zero. In this adjustment method, the pre-deflection optical system board 200 is not adjusted. In the case where this adjustment method is fixedly employed in a machine, adjustment constitution to the pre-deflection optical system such as the pre-deflection optical system board 200 can be omitted.

(1) The motor board 150 fixing the light deflection device 7 (polygon motor 7b), the pre-deflection optical system board 200 mounting the pre-deflection optical systems 5 (Y, M, C, and B), and the fθ lens board 250 mounting the fθ lenses 21a and 21b are placed. (2) After a laser beam from the pre-deflection optical systems 5 (Y, M, C, and B) group is reflected toward a scanning direction by the polygon mirror 7a, a reflection surface angle (inclination quantity) of the polygon mirror is adjusted so as to make the beam passing position close to a designed value. In this case, the measurement position is the position before the laser beam reaches the nearer fθ lens 21a. (3) After the laser beam deflected by the polygon mirror 7a at a scanning direction passes through the two fθ lenses 21a and 21b fixed to the fθ lens board 250, the fθ lens board 250 is adjusted so as to make the beam passing position close to a designed value at a predetermined point.

(B-6) This adjustment method also sets a relative error of an inclination quantity of the reflection surface of the polygon mirror 7a at zero. In this adjustment method, the fθ lens board 250 is not adjusted. In the case where this adjustment method is fixedly employed in a machine, adjustment constitution to the post-deflection optical system such as the fθ lens board 250 can be omitted.

(1) The motor board 150 fixing the light deflection device 7 (polygon motor 7b), the pre-deflection optical system board 200 mounting the pre-deflection optical systems 5 (Y, M, C, and B), and the fθ lens board 250 mounting the fθ lenses 21a and 21b are placed. (2) Before a laser beam from the pre-deflection optical systems (Y, M, C, and B) mounted on the pre-deflection optical system board 200 reaches the polygon mirror 7a, the pre-deflection optical system board 200 is adjusted so as to make the beam passing position close to a designed value at a predetermined point. After adjustment of the pre-deflection optical system board 200, a discrete element of the respective pre-deflection optical systems 5 (Y, M, C, and B) may be adjusted so as to make the beam passing position close to a designed value at a predetermined point. (3) After a laser beam from the pre-deflection optical systems 5 (Y, M, C, and B) group is reflected toward a scanning direction by the polygon mirror 7a, a reflection surface angle (inclination quantity) of the polygon mirror is adjusted so as to make the beam passing position close to a designed value. In this case, the measurement position is the position before the laser beam reaches the nearer fθ lens 21a.

(B-7) The adjustment methods of the above-mentioned embodiment and the above respective adjustment methods (B-1) to (B-6) adjust either three groups or two groups from three adjustable components.

However, only one group of component groups may be adjusted in the present invention.

(C) Other Embodiments

While the invention is described in various modifications of embodiments in the explanation of the above-mentioned embodiments, other modifications of the embodiment can be described hereinbelow.

The constitution in which the motor board 150, the pre-deflection optical system board 200, and the fθ lens board 250 and the like are slightly roratable is not limited to the above-mentioned embodiments. For example, the protruding portion can be replaced by two protrusions spaced along the extension direction of the protruding portion. In this case, such two protrusions are preferably placed at other points of an isosceles triangle in which the set screw position is the apex.

In the above-mentioned embodiments, although the multi-beam optical scanning device in which four beams are entered on the same surface of the polygon mirror is described, the present invention is applied to a multi-beam optical scanning device in which other beam numbers such as two beams, seven beams, and eight beams are entered on the same surface of the polygon mirror. Moreover, the present invention is applied to either a color type or monochrome type multi-beam optical scanning device including one or more optical parts for synthesizing a beam optical path which synthesizes a plurality of beam optical paths (beam splitter or half mirror) Further, the present invention is applied to an optical scanning device in which the only one beam is entered to one surface of the polygon mirror.

What is claimed is:

1. An optical scanning device, comprising:
a light source;
a pre-deflection optical device for applying a predetermined characteristic to a light beam irradiated from the light source;
a light deflection device mounted on a board for deflecting the light beam having a predetermined characteristic supplied from the pre-deflection optical device in a main scanning direction by reflection;

a post-deflection optical device having an image forming lens for focusing the deflected light beam irradiated from the light deflection device on an image forming surface; and a light deflection device adjusting mechanism comprising a fixed member, at least one fixing screw coupling the board to the fixed member, a protruding portion provided on a top surface of the fixed member that provides clearance between the fixed member and the board, and a set screw threaded through the fixed member and configured to enable adjustment of an inclination quantity of the light deflection device by adjusting an inclination quantity of the board.

2. The optical scanning device according to claim 1, further comprising a pre-deflection optical device adjusting mechanism, having a housing coupled by at least one fixing screw to a board upon which the light source and the pre-deflection optical device are attached and having a set screw threaded through the housing that is configured to simultaneously enable adjustment of an overall position and attitude of the light source and pre-deflection optical device, and adjust an incident position and/or angle in the sub scanning direction of the laser beam to the light deflection device.

3. The optical scanning device according to claim 1, further comprising a pre-deflection discrete element adjusting mechanism configured to enable adjustment of a position and/or attitude of a predetermined discrete element constituting the pre-deflection optical device and adjust an incident position and/or angle in the sub scanning direction of the laser beam to the light deflection device.

4. The optical scanning device according to claim 1, further comprising a post-deflection optical device adjusting mechanism, having a housing coupled by at least one fixing screw to a board upon which at least the image forming lens is attached and having a set screw threaded through the housing that is configured to enable adjustment of a position and/or attitude of the image forming lens and change a position and/or angle in a sub scanning direction of the light beam emitted from the image forming lens.

5. The optical scanning device according to claim 4, further comprising a pre-deflection optical device adjusting mechanism, having a housing coupled by at least one fixing screw to a board upon which the light source and the pre-deflection optical device are attached and having a set screw threaded through the housing that is configured to simultaneously enable adjustment of an overall position and attitude of the light source and pre-deflection optical device, and adjust an incident position and/or angle in the sub scanning direction of the laser beam to the light deflection device.

6. An optical scanning device, comprising:

a light source;

a pre-deflection optical device for applying a predetermined characteristic to a light beam irradiated from the light source;

a light deflection device for deflecting the light beam having a predetermined characteristic supplied from the pre-deflection optical device in a main scanning direction by reflection;

a post-deflection optical device having an image forming lens for focusing the deflected light beam irradiated from the light deflection device on an image forming surface; and a pre-deflection optical device adjusting mechanism, having a housing coupled by at least one fixing screw to a board upon which the light source and the pre-deflection optical device are attached and having a set screw threaded through the housing that is configured to simultaneously enable adjustment of an overall position and attitude of the light source and pre-deflection optical device, and adjust an incident position and/or angle in the sub scanning direction of the laser beam to the light deflection device.

7. The optical scanning device according to claim 6, further comprising a post-deflection optical device adjusting mechanism, having a housing coupled by at least one fixing screw to a board upon which at least the image forming lens is attached and having a set screw threaded through the housing that is configured to enable adjustment of a position and attitude of the image forming lens and change a position and/or angle in a sub scanning direction of the light beam emitted from the image forming lens.

8. The optical scanning device according to claim 6, further comprising a pre-deflection discrete element adjusting mechanism configured to enable adjustment of a position and/or attitude of a predetermined discrete element constituting the pre-deflection optical device and adjust an incident position and/or angle in the sub scanning direction of the laser beam to the light deflection device.

9. An optical scanning device, comprising:

a light source;

a pre-deflection optical device for applying a predetermined characteristic to a light beam irradiated from the light source;

a light deflection device for deflecting the light beam having a predetermined characteristic supplied from the pre-deflection optical device in a main scanning direction by reflection a post-deflection optical device having an image forming lens for focusing the deflected light beam irradiated from the light deflection device on an image forming surface; and a post-deflection optical device adjusting mechanism, having a housing coupled by at least one fixing screw to a board upon which at least the image forming lens is attached and having a set screw threaded through the housing that is configured to enable adjustment of a position and/or attitude of the image forming lens and change a position and/or angle in a sub scanning direction of the light beam emitted from the image forming lens.

10. An image forming apparatus, comprising:

the optical scanning device according to claim 1; and photoreceptors having surfaces to be scanned on which latent images are formed based on light beams from the optical scanning device.

11. An image forming apparatus, comprising:

the optical scanning device according to claim 6; and photoreceptors having surfaces to be scanned on which latent images are formed based on light beams from the optical scanning device.

12. An image forming apparatus, comprising:

the optical scanning device according to claim 9; and photoreceptors having surfaces to be scanned on which latent images are formed based on light beams from the optical scanning device.

* * * * *